(12) United States Patent
Kuehner et al.

(10) Patent No.: US 6,488,974 B1
(45) Date of Patent: Dec. 3, 2002

(54) PACKAGE CONTAINING A MILK PRODUCT OR MILK SUBSTITUTE PRODUCT

(75) Inventors: Holger Kuehner, Muehldorf (DE); Otto-Michael Wild, Gars am Inn (DE); Michael Schwan, Biglen (CH); Franz Haslinger, Frankfurt (DE)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/532,173

(22) Filed: Mar. 20, 2000

Related U.S. Application Data

(63) Continuation-in-part of application No. PCT/EP98/05907, filed on Sep. 16, 1998.

(30) Foreign Application Priority Data

Sep. 24, 1997 (EP) ............................................ 97202924

(51) Int. Cl.[7] .......................... B65D 83/14; B65D 83/16
(52) U.S. Cl. ..................... 426/116; 426/115; 426/570; 426/130; 222/190; 222/402.21; 222/402.23
(58) Field of Search .................................. 426/116, 570, 426/564, 115, 190, 130; 222/402.1, 402.21, 402.23, 565, 402.13

(56) References Cited

U.S. PATENT DOCUMENTS

| | | | |
|---|---|---|---|
| 2,977,231 A | | 2/1961 | Wolfson ........................ 99/79 |
| 3,677,443 A | | 7/1972 | Smadar et al. ................. 222/94 |
| 3,800,036 A | * | 3/1974 | Gabby et al. ................ 426/164 |
| 4,061,252 A | * | 12/1977 | Riccio .................... 222/402.18 |
| 4,071,196 A | * | 1/1978 | Burke et al. ................. 239/492 |
| 4,199,608 A | | 4/1980 | Gilmore et al. ............. 426/570 |
| 4,343,825 A | * | 8/1982 | Takada et al. .............. 426/570 |
| 4,836,422 A | * | 6/1989 | Rosenberg ................... 222/190 |
| 4,851,239 A | * | 7/1989 | Amen et al. ................... 426/43 |
| 4,901,891 A | * | 2/1990 | Goncalves ............. 222/402.13 |
| 5,255,851 A | * | 10/1993 | Tobler ......................... 239/343 |
| 5,725,155 A | | 3/1998 | Henkel et al. .............. 239/343 |
| 5,848,729 A | * | 12/1998 | Thornton .................... 222/190 |

FOREIGN PATENT DOCUMENTS

| | | |
|---|---|---|
| CA | 2218659 | 10/1996 |
| WO | 94 28759 A | 12/1994 |
| WO | 97 33813 A | 9/1997 |

* cited by examiner

*Primary Examiner*—Milton I. Cano
*Assistant Examiner*—Robert Madsen
(74) *Attorney, Agent, or Firm*—Winston & Strawn

(57) ABSTRACT

The invention relates to a package for dispensing a foamed milk product. This package includes an aerosol can which contains a liquid phase in which a propellant gas is dissolved. The can is provided with a valve and a nozzle immediately downstream of the valve for spraying and foaming of the liquid phase. The nozzle has a central borehole and at least one lateral orifice which opens into an outlet tube. As the liquid phase is dispensed through the nozzle, a foam is generated.

14 Claims, 1 Drawing Sheet

PACKAGE CONTAINING A MILK PRODUCT OR MILK SUBSTITUTE PRODUCT

CROSS REFERENCE TO RELATED APPLICATIONS

This application is a continuation-in-part of the U.S. phase of international application PCT/EP98/05907 filed Sep. 16, 1998.

TECHNICAL FIELD

The invention relates to a package that contains a milk or milk substitute product in the liquid phase.

BACKGROUND ART

It is already known to produce milk in pressurized cans. PCT Publication WO 96/33618 relates to a pressurized milk package which comprises, for example, $CO_2$ in the dissolved state. This patent relates to a drink similar to a sweetened and carbonated drink. PCT Publication WO Patent 97/33813 discloses an aerosol can having a valve and a nozzle.

There is a need for a package that achieves a satisfactory foam effect when dispensing milk products, however, and these known products are insufficient in this regard. Thus, the present invention now provides a package containing milk concentrate or milk without fat, which package, during use, generates a foam.

SUMMARY OF THE INVENTION

The invention relates to a package for dispensing a foamed milk product. This package includes an aerosol can which contains a liquid phase in which a propellant gas is dissolved. The can is provided with a valve and a nozzle immediately downstream of the valve for spraying and foaming of the liquid phase. The nozzle has a central borehole and at least one lateral orifice which opens into an outlet tube. As the liquid phase is dispensed through the nozzle, a foam is generated.

BRIEF DESCRIPTION OF THE DRAWINGS

The invention is described with reference to the accompanying drawings, in which.

DETAILED DESCRIPTION OF THE PREFERRED EMBODIMENTS

Figure 1:
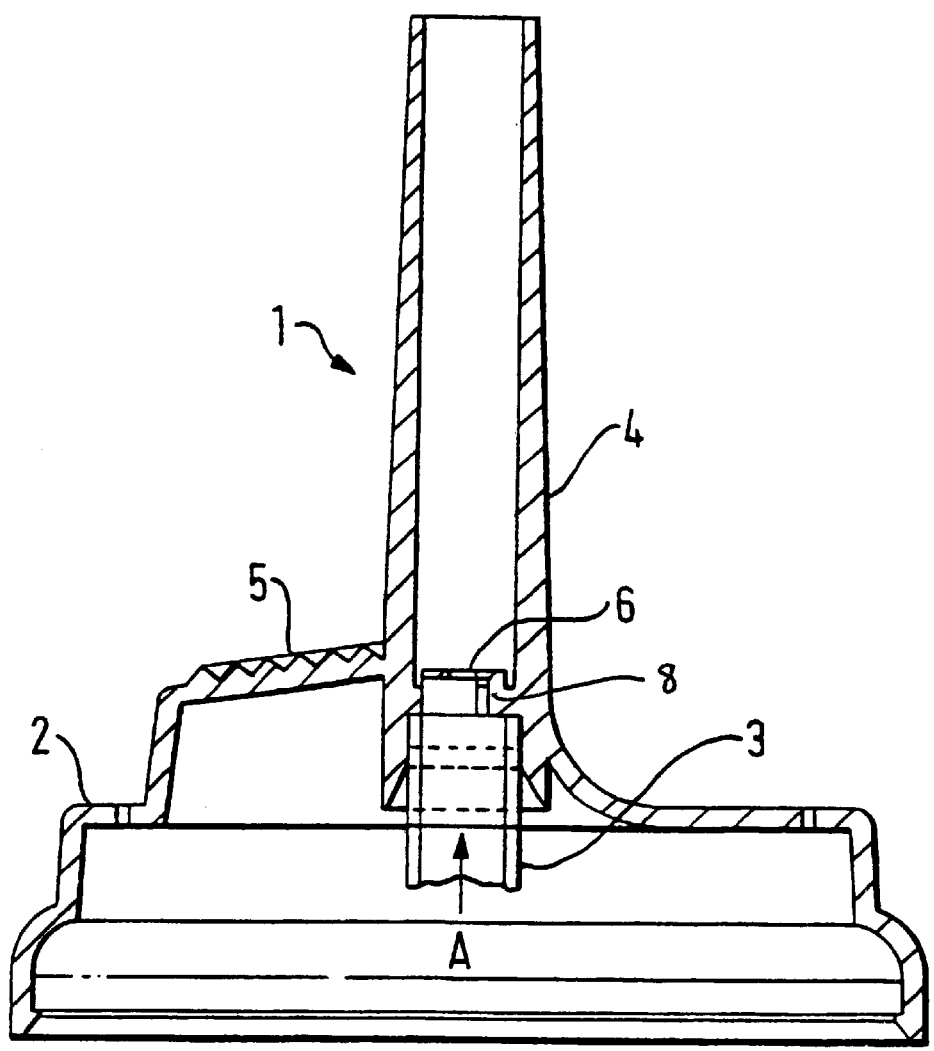
FIG. 1 shows a section of the nozzle of the aerosol can of the invention.

In the following description, all percentages are by weight unless otherwise designated.

The invention is directed to a package that includes an aerosol can for dispensing milk or milk substitute product. The can contains a liquid phase of the desired product. In particular, the liquid phase is pure concentrated milk, evaporated milk, or a partial or total milk substitute. The liquid phase typically includes a fat content of up to 20%, preferably between about 4 and 12%, and a non-fat solids content of between about 6 and 25%, preferably between about 15 and 20%.

The type of propellant gas that can be used in the aerosol can of the invention is not critical. Any inert gas which is compatible in the food sector can be used. For example, $N_2O$, HFC, HCFC or $CO_2$ may typically be used, with the use of $N_2O$ being preferred. The ratio of propellant gas/liquid phase is not critical and preferably is in the range of from about 1:4 to 1:5.

The aerosol can is dimensioned so as to contain a weight of from about 100 to 500 g of liquid phase. The valve is a conventional one, but the nozzle preferably has a specific geometry which is described in more detail hereinafter. This arrangement permits a satisfactory foam to be prepared. Satisfactory is taken to mean a foam having a good expansion ratio and having a good persistence, i.e. one on the order of 2–4 minutes.

The possible liquid phases are mentioned above. Pure concentrated milk is taken to mean either a fresh milk which has been subjected to an evaporation in order to reduce the water content, or a recombined milk in which the dry matter content can be set. Recombined milk is envisaged to be milk from both skimmed milk powder and whole milk powder. This pure concentrated milk can optionally include sugars, sweeteners or flavorings. The content of these additives typically varies from about 0.1 to at most 5%. The sweeteners may also be sugar substitutes, such as saccharin or cyclamate. The flavoring is typically present in an amount of about 0.05 to less than 1%. Chocolate, cocoa, coffee, aroma substances, fruit (e.g., strawberry) extract, vanilla and spices can be used depending upon the desired flavor of the product.

The evaporated milk is similar to pure concentrated milk, except that this milk additionally comprises a stabilizer, such as disodium hydrogenphosphate. This evaporated milk can likewise comprise sugars, sweeteners or flavorings.

A partial milk substitute product is taken to mean a milk in which the fat content consists of a milk fat portion and vegetable fat portion with the non-fat solids including milk, whey protein concentrate and foam stabilizers. This partial milk substitute product can also comprise sugars, sweeteners and/or flavorings. The preferred foam stabilizers include gelatin, carrageenan, guar seed flour, carob bean meal, a mono- or diglyceride or mixtures thereof. The vegetable fat is preferably selected from the group consisting of coconut fat, palm oil, soya oil, corn oil.

A total milk substitute product is taken to mean a product having a fat portion of a vegetable fat and a non-fat solids content of a carbohydrate, caseinate and foam stabilizer. The carbohydrates are preferably selected from the group consisting of maltodextrin and glucose syrup. The vegetable fat and the foam stabilizers can be the same as those already mentioned above. This total milk substitute product can also comprise sugars, sweeteners or flavorings.

The package of the invention preferably contains a liquid phase which has a fat content of between about 4 and 12% and a non-fat solids content of between about 15 and 20%.

The nozzle has at least one lateral orifice, but the number of these lateral orifices can range between 1 and 5. In the drawing figures, a preferred nozzle is shown with three lateral orifices. The central borehole usually has a diameter of approximately 1 mm and a borehole area of approximately 0.8 mm². The lateral orifices are usually rectangular and each orifice has an orifice area of approximately 0.27 mm². The ratio of the central borehole area to the lateral orifice area is between about 1:0.3 and 1:1.5.

The central borehole, during injection of the liquid, provides force and energy while the lateral orifices provide the foaming effect. It is possible to achieve an overrun of up to 350% by this arrangement.

The novel package containing a liquid phase of pure concentrated milk is produced according to the following process. The raw milk is skimmed by a conventional process and pasteurized. This milk is then standardized to achieve the desired fat/non-fat solids content and concentrated by a conventional process. If appropriate, any additional formula components (i.e., sweeteners or flavorings) are admixed in a conventional mixing process. In the case of variants not containing milk, the addition of these components is performed in water. It is also possible to recombine the added portions by mixing. The product is then ultra high temperature ("UHT") sterilized utilizing a temperature of between 125 and 150° C. for a time between about 1 second and 5 minutes.

The product is then homogenized at a pressure of from about 30 to 350 bar. Finally, the product is aseptically packaged into the aerosol cans with the addition of the propellant gas. A spray nozzle, which enables the product to be injected, e.g., into coffee with formation of a smooth fine-pored foam, is mounted on the valve of the aerosol can. This sterile packaging achieves a shelf life of at least six months during refrigerated or unrefrigerated storage.

A foam is generated during use of the novel package. The foam can be used in beverages such as coffee or hot chocolate, or in conjunction with another food, for example in the dessert sector, as a topping on puddings, pastries, fruits or fruit salads, or ice cream. The foam provided by the product is similar to the foam provided on cappuccino. The product is present in the can in liquid form, but on spraying by means of the propellant gas, foam is generated by the nozzle. Owing to the possible injection into a hot beverage such as coffee, a certain temperature equilibration between foam and coffee can occur. This foaming and the injection into the coffee are enabled by the special spraying nozzle. The nozzle is described in more detail below in connection with the drawing figures.

The foam can also be introduced first and the coffee poured on later; this achieves the same effect in the finished coffee. The coffee is whitened by the foam in essentially the same manner as with milk or evaporated milk.

Referring now to the drawing figures, the nozzle (1) includes an attachment (2) which sits above the mouth of the valve (3), and an outlet tube (4). On the attachment is a pressure point (5) which permits the actuation of the valve. The outlet tube has on the inside a spider (6). In the embodiment shown, the outlet tube (4) is open substantially only at an outlet opening (9) disposed adjacent and end of the tube (4) and is closed adjacent the valve (3). Also, in this embodiment the nozzle (1) is disposed in the interior space (10) of the outlet tube (4), downstream of the valve (3). This spider has a central borehole (7) and three lateral orifices (8). The central borehole has a diameter of 1 mm and each lateral orifice has a width of 0.6 mm and a height of 0.42 mm, which leads to a central area of 0.800 mm$^2$ and a total lateral area of 0.830 mm$^2$.

The valve functions in the following manner: the consumer presses on the point (5) which opens the valve. The milk phase then flows in the central borehole (7) and from the lateral orifices (8) in the form of a foam. The flow in the center produces an injection effect, that is to say a motion effect, while the lateral borehole permits rather a greater foaming effect. The ratio of the central to the lateral amount of the foam is approximately 2:1. The injection effect produces a good diffusion in the coffee, which leads to a temperature equilibration.

EXAMPLES

The invention is now described in more detail with reference to the examples.

Example 1

Figure 2:
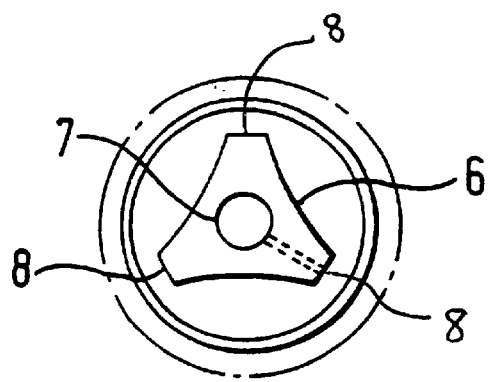
FIG. 2 shows a bottom view of the invention according to arrow A.

The raw milk is standardized, i.e., fat was added in order to achieve a fat content of 10%. The resultant milk is then concentrated in order to obtain a non-fat solids content of 17%. The propellant gas is N$_2$O having a weight of approximately 2 g in approximately 250–260 g of milk. UHT sterilization at 148° C. for 5 seconds is carried out and aseptic packaging into an aerosol can then takes place. A nozzle according to FIGS. 1 and 2 is mounted on the can.

The minimum shelf life for this product is approximately six months. The foam height on coffee is to be 1–2 cm with a foam persistence of 3 minutes.

Example 2

A similar experiment to that in Example 1 was carried out except that the fat content was set to 8%, with a solids-not-fat content of 17%.

A similar result to that of Example 1 was achieved as to the foam.

What is claimed is:

1. A package for dispensing a foamed milk product comprising:

a liquid phase, in which a propellant gas is dissolved;

an aerosol can which contains the liquid phase and which is provided with a valve that has a valve outlet;

an outlet tube; and a nozzle immediately downstream of the valve for spraying and foaming of the liquid phase, the nozzle having a central borehole and at least one lateral orifice, wherein the central borehole and the lateral orifice open are into the outlet tube and are in fluid communication with the valve outlet for spraying the liquid phase through the central borehole and the lateral orifice through the outlet tube;

wherein the liquid phase comprises pure concentrated milk, evaporated milk, a partial or total milk substitute and has a fat content between 0 and 20% and a non-fat solids content of between about 6 and 25%, wherein dispensing of the liquid phase through the nozzle generates a foam.

2. The package of claim 1, wherein the nozzle has between 1 and 5 lateral orifice(s).

3. The package of claim 1, the propellant gas is N$_2$O, HFC, HCFC or CO$_2$.

4. The package of claim 1, wherein the liquid phase has a fat content of between about 4 and 12% and the non-fat solids content is between about 15 and 20%.

5. The package of claim 1, wherein the liquid phase further comprises one or more of a sugar, a sweetener or a flavoring.

6. The package of claim 1, wherein the liquid phase is a partial milk substitute which comprises, with regard to the fat portion, a milk fat portion and vegetable fat, and, with regard to the non-fat solids, milk, a milk protein concentrate, a whey protein concentrate and a foam stabilizer.

7. The package of claim 6, wherein the vegetable fat is coconut fat, palm oil or corn oil.

8. The package of claim 6, wherein the foam stabilizer is gelatin, a carrageenan, guar seed flour, carob bean meal or a mono- or diglyceride.

9. A The package of claim 1, wherein the liquid phase is a total milk substitute with the fat content comprising a vegetable fat and the non-fat solids comprising a carbohydrate, a caseinate and a foam stabilizer.

10. The package of claim 9, wherein the vegetable fat is coconut fat, palm oil or corn oil.

11. The package of claim 9, wherein the foam stabilizer is gelatin, a carrageenan, guar seed flour, carob bean meal or a mono- or diglyceride.

12. The package of claim 1, wherein the nozzle has 3 lateral orifices.

13. The package of claim 12, wherein the lateral orifices are rectangular in cross-section.

14. The package of claim 1 wherein the central borehole and lateral orifices have respective cross-sectional areas that form a ratio of between about 1:0.3 and 1:1.5.

* * * * *

UNITED STATES PATENT AND TRADEMARK OFFICE
CERTIFICATE OF CORRECTION

PATENT NO.    : 6,488,974 B1
DATED         : December 3, 2002
INVENTOR(S)   : Kuehner et al.

It is certified that error appears in the above-identified patent and that said Letters Patent is hereby corrected as shown below:

<u>Title page,</u>
Please delete the figure and insert therefore the following figure:

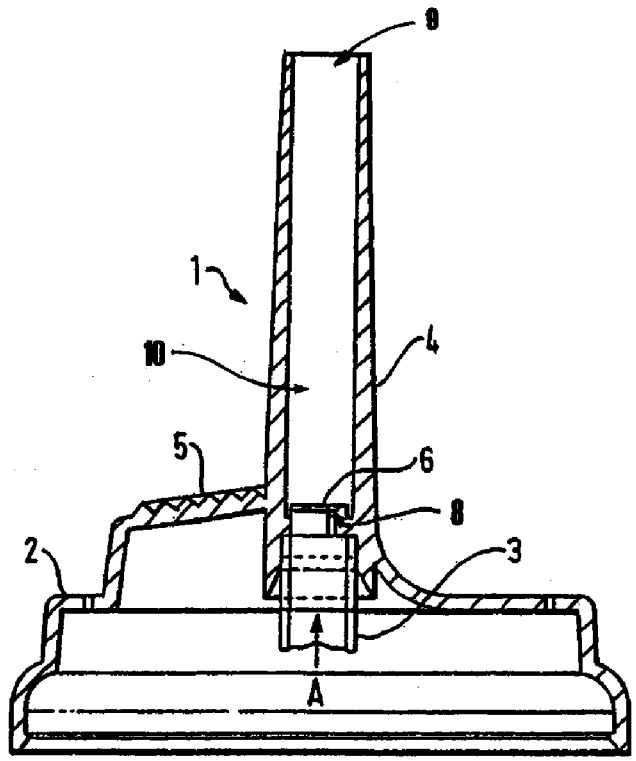

UNITED STATES PATENT AND TRADEMARK OFFICE
CERTIFICATE OF CORRECTION

PATENT NO.    : 6,488,974 B1
DATED         : December 3, 2002
INVENTOR(S)   : Kuehner et al.

It is certified that error appears in the above-identified patent and that said Letters Patent is hereby corrected as shown below:

<u>Drawings,</u>
Please delete Fig. 1 and Fig. 2 and insert therefore the following Fig. 1 and Fig. 2:

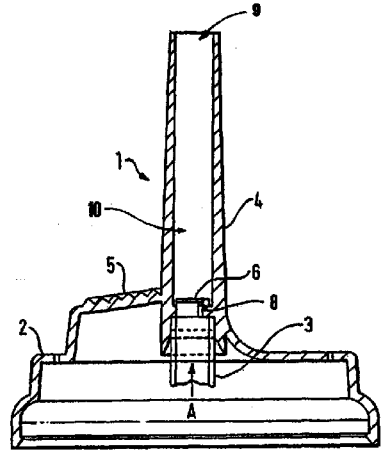

FIG. 1

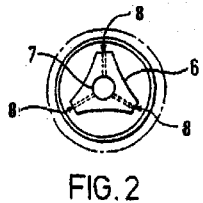

FIG. 2

Signed and Sealed this

Twenty-sixth Day of August, 2003

JAMES E. ROGAN
*Director of the United States Patent and Trademark Office*